(12) United States Patent
Riley

(10) Patent No.: US 8,422,374 B2
(45) Date of Patent: *Apr. 16, 2013

(54) COMBOPHONE WITH QOS ON CABLE ACCESS

(75) Inventor: Yusun Kim Riley, Marlborough, MA (US)

(73) Assignee: Camiant, Inc., Marlborough, MA (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/158,973

(22) Filed: Jun. 13, 2011

(65) Prior Publication Data

US 2011/0243128 A1    Oct. 6, 2011

Related U.S. Application Data

(63) Continuation of application No. 11/879,207, filed on Jul. 16, 2007, now Pat. No. 7,961, 623.

(60) Provisional application No. 60/807,535, filed on Jul. 17, 2006.

(51) Int. Cl.
*H04L 12/28* (2006.01)
*H04L 12/56* (2006.01)

(52) U.S. Cl.
USPC ............................ 370/236; 370/389; 370/401

(58) Field of Classification Search .................. None
See application file for complete search history.

(56) References Cited

U.S. PATENT DOCUMENTS 6,366,577 B1    4/2002  Donovan
7,068,645 B1    6/2006  Phadnis et al.
7,649,848 B1    1/2010  Swan et al.
7,961,623 B2    6/2011  Riley
2003/0079018 A1    4/2003  Lolayekar et al.
(Continued)

FOREIGN PATENT DOCUMENTS

EP    1 638 261 A1    3/2006
EP    2 049 909 B1    2/2012
WO    WO 2006/059931 A1    6/2006

OTHER PUBLICATIONS

Notice of Allowance and Fee(s) Due for U.S. Appl. No. 11/879,207 (Oct. 27, 2010).

(Continued)

*Primary Examiner* — Marsha D. Banks Harold
*Assistant Examiner* — Matthew Campbell
(74) *Attorney, Agent, or Firm* — Jenkins, Wilson, Taylor & Hunt, P.A.

(57) ABSTRACT

A method of providing QoS to a session from a client to a first network includes providing data packets from the client to be conveyed in a session from the client to a first network, inserting each of the data packets into an encapsulating packet, and transmitting the encapsulating packets through the second network to the first network, forming a tunnel through the second network. The method includes receiving the encapsulating packets at a terminating device in the first network. The terminating device removes the encapsulating headers to recover the data packets. The method includes determining an association between the packet headers of the data packets and the encapsulating headers, identifying data packets requiring QoS, and using the association to identify encapsulating packets corresponding data packets requiring Quality of Service. The method includes applying QoS to the encapsulating packets, corresponding to the session of data packets requiring the QoS, being conveyed through the tunnel.

14 Claims, 4 Drawing Sheets

U.S. PATENT DOCUMENTS

| | | | |
|---|---|---|---|
| 2004/0213210 A1 | 10/2004 | Dube et al. | |
| 2005/0088977 A1 | 4/2005 | Roch et al. | |
| 2005/0102529 A1 | 5/2005 | Buddhikot et al. | |
| 2007/0115898 A1* | 5/2007 | Stein | 370/338 |
| 2007/0147378 A1 | 6/2007 | Elgebaly et al. | |
| 2008/0019370 A1 | 1/2008 | Riley | |

OTHER PUBLICATIONS

Communication pursuant to Article 94(3) EPC for European Application No. 07810535.0 (Mar. 16, 2011).

Examiner's First Report for Australian Patent Application No. 2007275785 (Aug. 10, 2010).

Communication pursuant to Rules 70(2) and 70a(2) EPC for European Application No. 07810535.0 (May 11, 2010).

Final Official Action for U.S. Appl. No. 11/879,207 (May 26, 2010).

Communication for European Application No. 07810535.0 (Apr. 23, 2010).

Non-Final Official Action for U.S. Appl. No. 11/879,207 (Dec. 28, 2009).

Communication of European publication number and information on the application of Article 67(3) EPC for European Application No. 07810535.0 (Mar. 25, 2009).

International Search Report for International Application No. PCT/US07/16198 (Jan. 30, 2008).

Decision to grant a European patent pursuant to Article 97(1) EPC for European Application No. 07810535.0 (Jan. 26, 2012).

* cited by examiner

COMBOPHONE WITH QOS ON CABLE ACCESS

CROSS REFERENCE TO RELATED APPLICATIONS

This application is a continuation of U.S. patent application Ser. No. 11/879,207, filed Jul. 16, 2007, which claims the benefit of U.S. Provisional Patent Application Ser. No. 60/807,535, filed Jul. 17, 2006, the disclosures of which are incorporated herein by reference in their entireties.

BACKGROUND OF THE INVENTION

The present invention relates to communication systems and services for distributing digital content, and more particularly, to techniques for accessing a network through two or more alternative networks, while providing appropriate Quality of Service (QoS) through the alternative networks.

In currently existing communication networks, subscribers can access the Internet through access networks provided by cable or DSL operators. Similarly, mobile customers can receive mobile service (e.g., cellular phone service) through cellular network provided by their cellular provider. Mobile customers may use, for example, the TDM (time division multiplex) circuitry of the cellular network to make voice calls.

As more services become IP enabled, service providers or operators have innovative ways of delivering these services. One example of such an IP enabled service is voice over IP (VoIP), where voice information is digitized, turned into IP packets, and sent over the Internet to the receiving 'phone.' Such innovative delivery techniques are becoming available for many services, another important example being video based services.

Some providers are beginning to leverage their IP networks for the delivery of services that mimic those of mobile services. For example, recently-available phones can operate in a 'multi-mode' function. Multi-mode refers to the fact that these mobile devices can 'attach' to different networks using entirely different technologies. An example of a multi-mode device (also referred to herein as a "combophone") is one that can communicate via a wireless local area network (WLAN) based on the WiFi standard (IEEE 802.11), as well as 3G (CDMA and GSM based 3GPP2/3GPP standards, respectively) and traditional TDM protocols. With a multi-mode device, all of these capabilities are built into a single mobile unit that can attach to a WiFi network, or a 3G mobile data network, or even the traditional TDM circuit based mobile network. The reason for the multi-modality is that depending on the strength of the network signal (which would directly impact the service quality), the operational cost of such a network, or other operational considerations, an advantage may exist for the device to use one particular network over another, in order to deliver a particular service.

Due to weak cellular signals at a user's home, a multi-mode mobile unit may attach to a WiFi network instead of using the regular TDM based cellular network, and initiate a VoIP session via the WiFi network in order to make a phone call. The WiFi network is typically provided by a home WiFi device/gateway, which attaches to a high speed data network (e.g., cable broadband, xDSL or fiber) at the terminal end of the WiFi link. The VoIP traffic is often encapsulated in an IP tunnel (typically, this tunnel is implemented with IPSEC). The VoIP traffic is 'tunneled' through the access provider's (e.g., Cable or xDSL or fiber operator) network and is brought all the way back to the mobile service provider's IP based network. Once the VoIP traffic reaches the mobile service provider's network, the IP tunnel is 'terminated' and the VoIP traffic that was transported through the tunnel is extracted and communicated in the mobile provider's network. Ultimately, the VoIP traffic terminates in a voice gateway to be converted back into TDM traffic.

In this example, the subscriber's 'home network' is the mobile provider's network, because the application infrastructure responsible for serving the subscriber is in the mobile network. The cable or xDSL network through which the device tunneling is considered to be the visited network.

FIG. 1 illustrates the general packet formatting used to create a tunnel as described above. An un-encapsulated packet 10 includes an IP header 12, a UDP header 14, and MIP control data 16. In order to form an IP tunnel, the original packet 10 is embedded within an encapsulated packet 20 by adding an ESP header 22, an ESP trailer 24, a NAT-T UDP header 26 and an IPSEC IP header 28 (these are referred to in general below as "encapsulating headers" or "tunnel headers"). In general, network components that implement the tunnel ignore the IP header 12 and the UDP header 14, and only evaluate the NAT-T UDP header and the IPSEC IP header 28.

Sending information through a tunnel as described above complicates the provision of appropriate QoS for the tunneled content. Consider the network architecture shown in FIG. 2, in which a multiple system operator (MSO—e.g., cable) network is depicted in the lower portion of the figure, and a wireless service provider network (in this example, Sprint) is depicted in the upper portion of the figure. FIG. 2 illustrates the steps necessary to request QoS for the session from the dual mode phone 30, through the MSO network to the Sprint network.

In the first step [1], the client signals to the SIP Edge Proxy 32, using its address IPmp to identify itself.

In the second step [2], the SIP Edge Proxy 32 signals to the PS 34 in the mobile network using IPmp as the identifier for the subscriber phone 30.

In the third step [3], the PS 34 figures where in the MSO network the peer PS 36 resides (using the address IPmp). The simplest way to perform this function is to map the address to the list of subnets associated with a particular peering PS. This information may be provisioned/configured on the PS, or it may be learned from the network. The PS 34 in the mobile network signals the QoS policy request to the correct PS 36 in the MSO network using the IPmp to identify the client.

In the fourth step [4], the PS 36 in the cable network identifies the correct cable modem termination system (CMTS) 38 (or edge device) to control (the device behind which the subscriber/client is located) and issues the messaging to the CMTS 38.

In the fifth step [5], the CMTS 38 (or edge device) issues the appropriate signaling with the cable modem in the home with the WiFi access point 40 to affect the QoS for the media traffic over the access network (in this example, it is the DOCSIS network).

In the sixth step [6], the media stream for the dual mode phone 30 traverses the visited access network (i.e., the MSO network) with Quality of Service—the stream is identified by the CMTS 38 using the IPmp address (as packets associated with the media stream will have the IPmp as the source IP address in the IP header of the packet).

The example described above accesses the Sprint network (the home network of the dual mode phone through the visited MSO network without the use of tunneling. The packets traversing the two networks use the same header information (i.e., the client IP headers) regardless of through which network they are passing, so the SIP proxy 32 in the Sprint network informs the peering policy server 36 which packets are to be given enhanced QoS through the visited network by simply identifying the packet's client IP headers.

Providing QoS in a network environment that uses tunneling to convey packets through the visited network is more complicated, because the encapsulating headers used to convey the packets through the visited network are typically not the underlying client IP headers of the packet, as described relative to FIG. 1. Once the SIP proxy 32 receives the packets, the encapsulating headers have already been stripped from the packets. On the other hand, the peering policy server 36 and the underlying cable MSO visiting/serving network identify the packets associated with the session with the encapsulating/tunnel headers. The visited network is typically unaware of the header inside the packet and can only operate on the sessions based on the tunnel header. The SIP proxy 32 signals to the policy server 34 in the Sprint network using the address of the underlying client IP header (because it does not have the tunnel address). The Sprint policy server may signal to the Cable MSO policy server 36 the address of the client. However, this address differs from the tunnel IP address, and thus does not provide the correct information to enable policy server 36 to identify the correct edge device/CMTS that is responsible for enforcing QoS for the session, nor would the edge device be able to correctly identify the packets associated with the client's session.

SUMMARY OF THE INVENTION

The described embodiments enable delivering Quality of Service (QoS) for IP based media sessions, which are encapsulated in an IP tunnel. The policy server for the network providing the tunnel performs the proper mapping between the internal address within the payload of the packet, and the outer IP address associated with the tunnel. Thus, the described embodiments apply QoS for a session that is encapsulated in a tunnel. These embodiments discover the correct policy server and the correct CMTS/edge device in the visited network for applying QoS by mapping the inner address of the client to the outer tunnel address (the address that is routable in the visited network).

The described embodiments provide address translation, and the QoS policy is applied only when the call is being made, thereby alleviating the need for QoS resources to be wasted on the tunnel when VoIP or similar sessions are not active.

The tunnel may be established for extended lengths of time, but QoS policy is in effect only when a voice call is active. This is because the QoS policy is triggered when the SIP signaling is initiated during the call setup. When the call ends, the client performs SIP signaling with the SIP edge proxy to signal that the call is over. In this scenario, the SIP Edge proxy issues teardown messages with the Policy Servers to trigger the teardown of the resource reservation for the VoIP calls. When the teardown completes, the QoS reservations are relinquished and the tunnel is no longer QoS enabled.

In one aspect, the invention includes a method of providing Quality of Service to a session from a client to a first network, wherein the session passes through a second network between the client and the first network. The method includes providing data packets to be conveyed in the session from the client to the first network. The data packets include packet headers for routing the packets. The method further includes inserting each of the data packets into an encapsulating packet having an encapsulating header, and transmitting the encapsulating packets through the second network to the first network, thereby forming a tunnel through the second network. The method also includes receiving the encapsulating packets at a terminating device in the first network. The terminating device removes the encapsulating headers to recover the data packets. The method further includes determining an association between the packet headers of the recovered data packets and the encapsulating headers used to transport the data packets through the tunnel, and identifying a session of data packets requiring Quality of Service, and using the association to identify encapsulating packets corresponding to the session of data packets requiring Quality of Service. The method also includes applying Quality of Service to the encapsulating packets, corresponding to the session of data packets requiring the Quality of Service, being conveyed through the tunnel.

One embodiment further includes storing the association between the packet headers of the recovered data packets and the encapsulating headers used to transport the data packets through the tunnel.

Another embodiment further includes identifying a session of data packets requiring Quality of Service in the first network, then conveying a requirement to apply Quality of Service to the encapsulating packets to the second network in response to the identification.

In one embodiment, peering policy servers communicate the requirement to apply the Quality of Service to the encapsulating packets.

Another embodiment further includes withdrawing Quality of Service from the encapsulating packets when the session of data packets no longer requires the Quality of Service.

In one embodiment, the terminating device further provides address translation of the packet headers.

In another aspect, the invention includes a method of providing Quality of Service to a session from a client to a first network, wherein the session passes through a second network between the client and the first network. The method includes forming a tunnel through the second network. Data packets of the session passing through the tunnel are encapsulated to form encapsulating packets. The method also includes applying Quality of Service to the tunnel only when the session requires Quality of Service.

One embodiment further includes receiving the encapsulated packets at a terminating device in the first network. The terminating device removes headers of the encapsulating packets to recover the data packets. The method also includes determining an association between packet headers of the recovered data packets and encapsulating headers used to transport the data packets through the tunnel, identifying a particular session of data packets requiring the Quality of Service, and using the association to identify encapsulating packets corresponding to the session of data packets requiring the Quality of Service. The method further includes applying the Quality of Service to the encapsulating packets, corresponding to the session of data packets requiring the Quality of Service, being conveyed through the tunnel.

One embodiment further includes providing peering policy servers to communicate a requirement to apply the Quality of Service to the encapsulating packets.

Another embodiment further includes withdrawing the Quality of Service from the encapsulating packets when the session of data packets no longer requires the Quality of Service.

In another aspect, the invention includes a method of providing Quality of Service to a session from a client to a first network, wherein the session passes through a second network between the client and the first network. The method includes forming a tunnel through the second network for conveying the session. The packets of the session within the tunnel are encapsulated to form encapsulating packets. The method also includes applying Quality of Service to the encapsulating packets within the tunnel.

One embodiment further includes receiving the encapsulating packets at a terminal end of the tunnel in the second network, extracting the packets of the session from the encapsulating packets, determining that the packets from the session require Quality of Service, identifying one or more network components within the second network responsible for maintaining the tunnel, and conveying to the one or more network components a requirement to apply Quality of Service to the tunnel.

Another embodiment further includes mapping headers of the packets of the session with respect to the encapsulating packets that contain the packets of the session, and conveying the mapping to the one or more network components within the second network responsible for maintaining the tunnel.

In another aspect, the invention includes a system for providing Quality of Service to a session from a client to a first network, wherein the session passes through a second network between the client and the first network. The system includes a client device for providing data packets to be conveyed in the session from the client device to the first network. The data packets include packet headers for routing the packets. The system also includes an encapsulating module for inserting each of the data packets into an encapsulating packet having an encapsulating header, and for transmitting the encapsulating packets through the second network to the first network, thereby forming a tunnel through the second network. The system also includes a terminating device in the first network for receiving the encapsulating packets at a, wherein the terminating device removes the encapsulating headers to recover the data packets, and for determining an association between the packet headers of the recovered data packets and the encapsulating headers used to transport the data packets through the tunnel. The system also includes a policy server (i) for identifying a session of data packets requiring Quality of Service, and using the association to identify encapsulating packets corresponding to the session of data packets requiring Quality of Service, and (ii) for applying Quality of Service to the encapsulating packets, corresponding to the session of data packets requiring the Quality of Service, being conveyed through the tunnel.

In one embodiment, the association between the packet headers of the recovered data packets and the encapsulating headers is stored in a memory device.

One embodiment further includes one or more peering policy servers in the second network for performing functions required to apply Quality of Service to the tunnel.

In another embodiment, the first network is a wireless service provider network, and the second network is a cable MSO network.

In another embodiment, the terminating device is a home agent server.

In one embodiment, the packet headers and the encapsulating headers are IP headers.

In yet another embodiment, a multi-mode device, for example a combophone, performs tunnel formation and termination functions at a client end of the tunnel, and a home agent server performs tunnel formation and termination functions at a first network end of the tunnel.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 3:
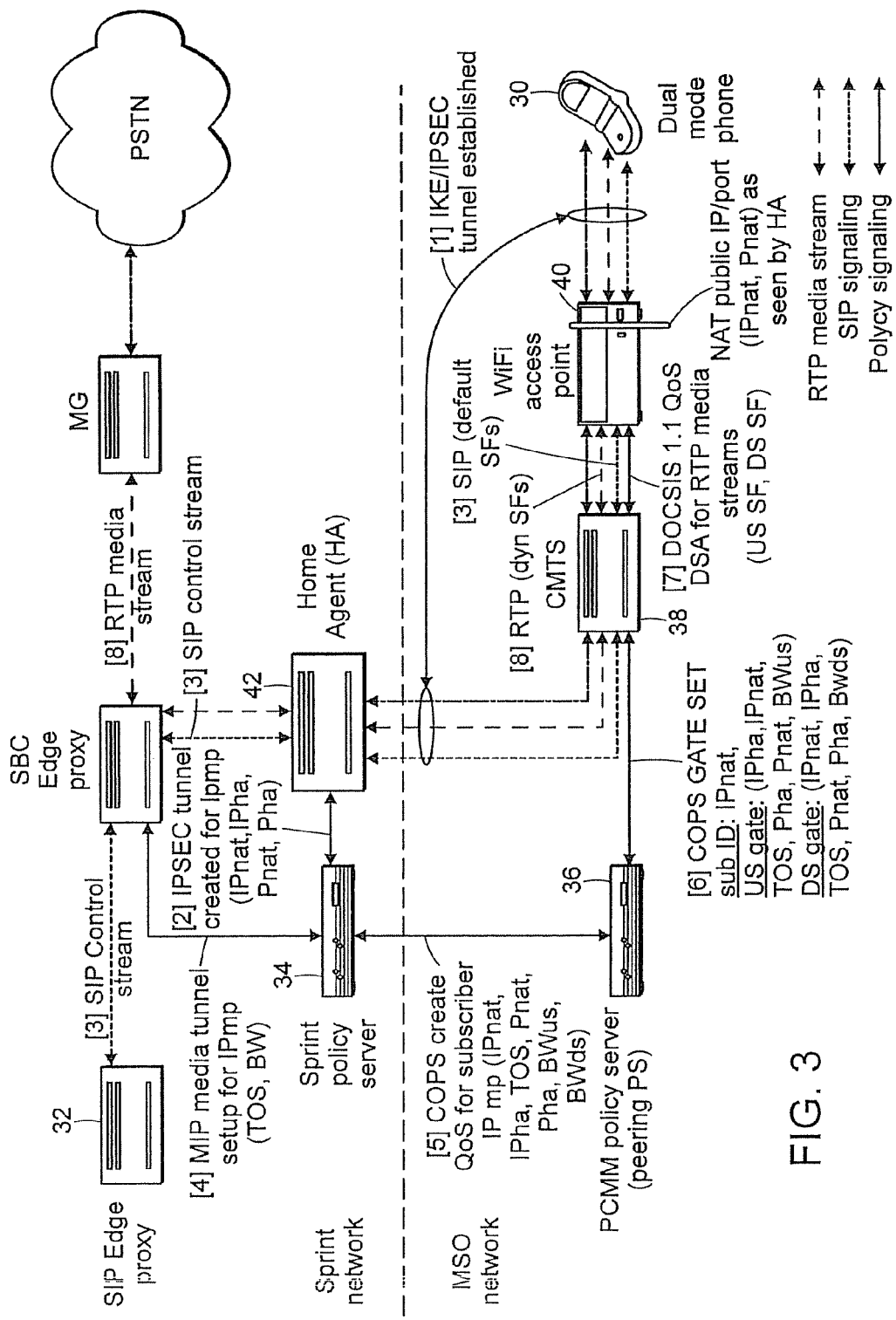
FIG. 3 shows an exemplary network architecture for providing QoS for a tunnel through a visited network, according to an embodiment of the invention.

FIG. 3 shows an exemplary network architecture for providing QoS for a tunnel through a visited network, according to an embodiment of the invention.

In order for the peering policy server in the home network 34 to effectively apply the QoS policy in the visited network, the policy server in the home network 34 determines the IP address of the tunnel (from the encapsulating headers), referenced to the client's IP address that it received in the signaling request from the SIP edge proxy 32. To do this, the peering policy server 34 communicates with the tunnel termination device (the home agent server HA 42 in FIG. 3) at the terminal end of the tunnel, which is responsible for a) removing the outer encapsulating headers from the tunnel packets, and forwarding the 'native' packet onto its destination in the mobile network for packets that are provided by the mobile client and destined for the mobile network and in the reverse direction (i.e., tunnel termination functions), and b) encapsulating IP packets from the mobile network with the tunnel header for packets that are traversing from the mobile network down to the client through the visited network (i.e., tunnel formation functions).

The mobile client 30 could be the other end of the tunnel (where the mobile client performs a similar function—where for packets destined for the client from the mobile network, the client strips the tunnel header off of the packet before presenting the packet with the correct address (IPmp) to the client's application. For packets that are traversing the reverse direction, the client is responsible for adding an encapsulating header to the packet, as it goes through the visited network and ultimately to the tunnel termination device in the home network. Alternatively, an external device (e.g., a WiFi gateway) in the home network could also perform the tunnel encapsulation/decapsulation function.

Figure 1:
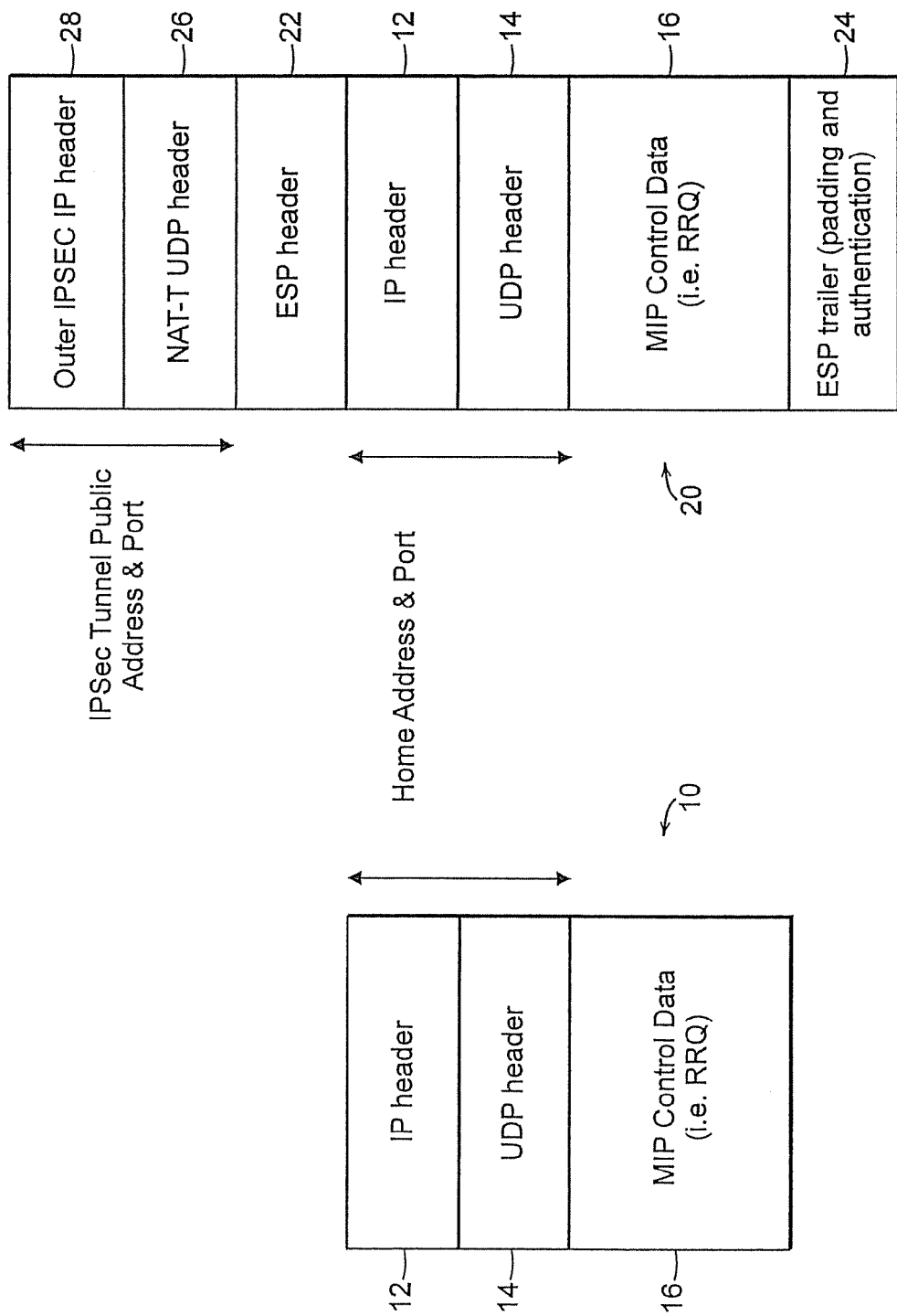
FIG. 1 illustrates the general packet formatting used to create a tunnel according to the described embodiments.
Figure 2:
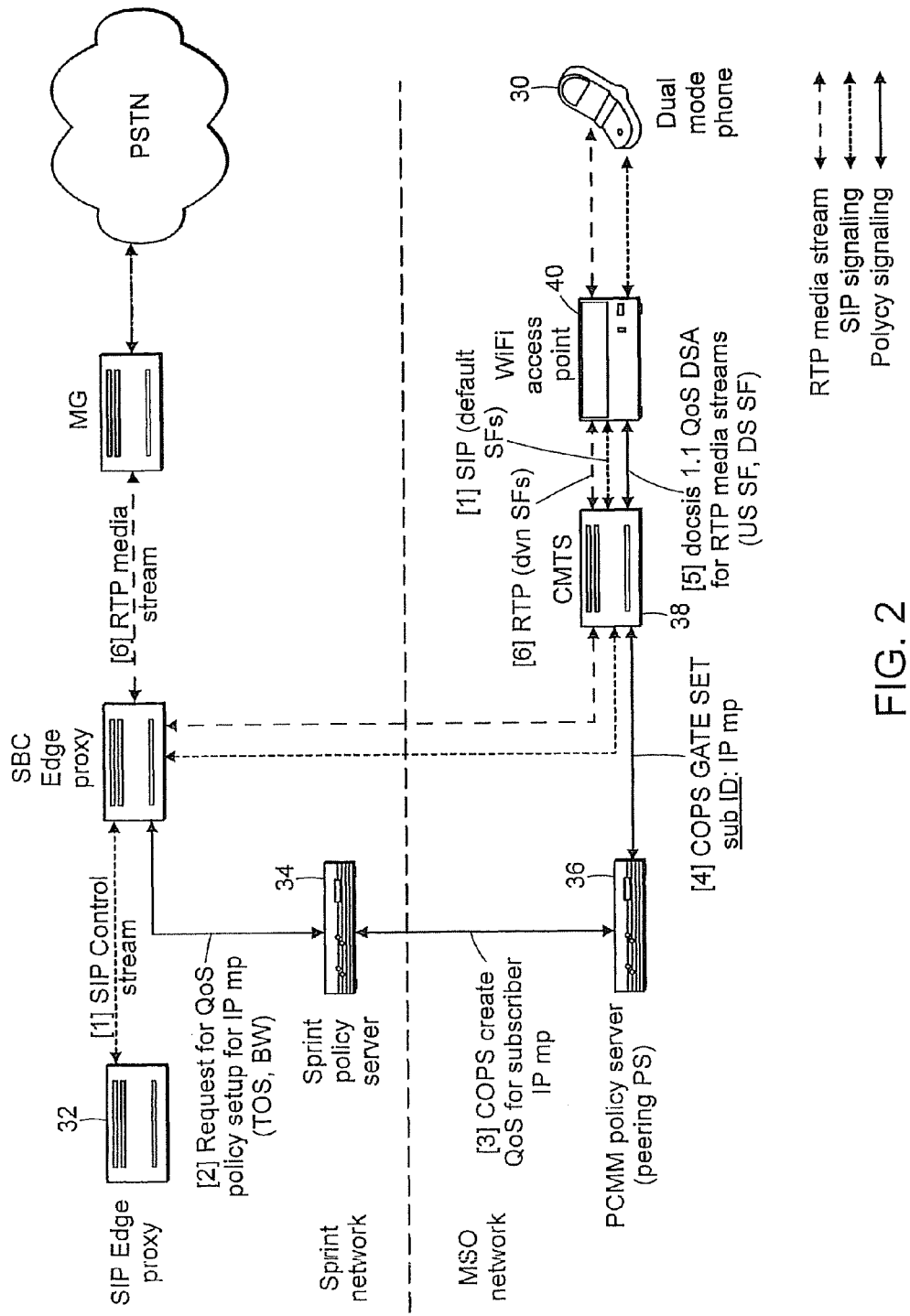
FIG. 2 illustrates the steps necessary to request QoS for the session from the dual mode phone without tunneling.

FIG. 3 illustrates the steps necessary to request QoS for the session from the dual mode phone 30, through the MSO network to the Sprint network. The procedure of FIG. 3 is similar to that shown in FIG. 2, except that FIG. 3 implements a tunnel through the MSO network.

In the first step [1] of FIG. 3, the client side of the link (the dual mode phone 30 side) establishes a tunnel with the tunnel termination point (in this example, HA 42). All traffic from the dual mode phone 30 to the Sprint network is encapsulated in the tunnel. The tunnel termination device 42 is responsible for 'stripping' off, or inserting, the encapsulating header for the packets, depending on the direction of the traffic.

In the second step [2], the tunnel termination device (or HA 42 in this example) is responsible for notifying the Sprint Policy Server 34 in the mobile network of the mapping of the IP address of the dual mode phone (in this example, IPmp) to the IP addresses of the tunnel end points (in this example, IPnat, IPha). This mapping information is determined and stored in a memory device as the outer headers (encapsulating headers) are removed at the terminal end of the tunnel.

In the third step [3], the client (dual mode phone 30) signals to the SIP edge proxy 32 for the required QoS. The packets travel through the tunnel, exit the tunnel (via the HA 42 in the Sprint network) and reach the SIP proxy 32 in the Sprint network. The SIP edge proxy 32 then signals to the Sprint policy server (PS) 34. When the SIP edge proxy 32 receives the signaling message from the client, the SIP edge proxy 32 has no information regarding the address of the tunnel, since the encapsulating headers have been removed by the HA 42. Once the encapsulating headers are removed, the SIP edge proxy 32 has only the address of the client—IPmp. The SIP edge proxy 32 signals to the Sprint PS 34 for QoS, using the IPmp to identify the client.

In the fourth step [4], the Sprint PS 34 receives the QoS request signal from the SIP edge proxy 32. The Sprint PS 34 maps the IPmp to a corresponding tunnel address. Using the information relating encapsulated headers to client headers the Sprint PS 34 received from the HA 42 in Step 2 (i.e., the stored mapping information described above), the Sprint PS 34 performs a lookup of IPmp and finds the associated IPnat, IPha information. Using this information, the Sprint PS 34 finds the corresponding Cable PS 36 (i.e., the PCMM policy server) and signals the Cable PS 36 using the addresses IPnat, IPha to identify the session that needs QoS.

In the fifth step [5], the Sprint PS 34 signals to the Cable PS 36 using IPnat and IPha to identify the session needing QoS. The Cable PS 36 identifies the correct CMTS/edge device 38 behind which the subscriber is located, and signals to the CMTS 38.

In the sixth step [6], the Cable PS 36 issues messaging to the CMTS 38 (or edge device) regarding the requested QoS.

In the seventh step [7], the CMTS 38 (or edge device) issues the appropriate signaling with the cable modem in the home to affect the requested QoS for the tunnel over the access network (i.e., the MSO network). Since the actual traffic for the dual mode phone client 30 is being conveyed within the tunnel, that actual traffic is inherently receiving the special treatment being applied to the tunnel.

In step eight, media flows through the tunnel which is now QoS enabled.

Figure 4:
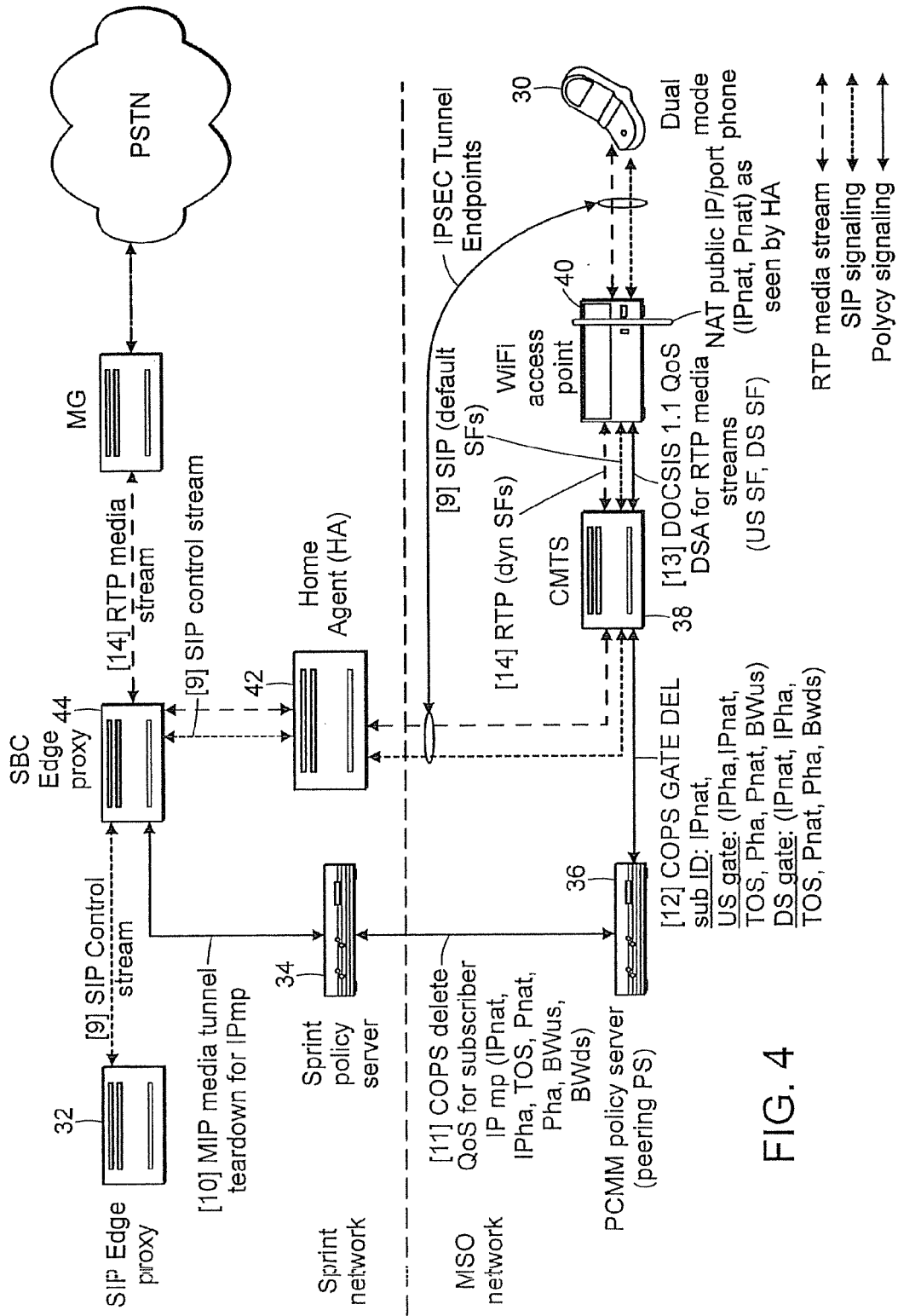
FIG. 4 illustrates the tear down procedures necessary for removing QoS on the tunnel that was set up in FIG. 3.

Further details of the call flow information relating to the above-described example of FIG. 3 is given as follows:
 1. MP initiates IKE with HA to create IPsec tunnel.
   IKE and SIP streams are carried over the default SFs between the CMTS and the MTA (NAT router+WiFi AP).
   NAT router translates MP's IPsec tunnel IP address and UDP port to (IPnat, Pnat).
 2. HA sends IPsec tunnel info to Sprint PS for IPmp.
   IPmp: (IPnat, IPha, Pnat, Pha)
 3. MP begins SIP session with Edge Proxy via the tunnel & SBC.
 4. SIP call setup begins for RTP media stream between IPmp and IPmg
   SBC sends RTP media QoS request to Sprint PS for MP at IPmp with TOS and BW requirements: IPmp: (TOS, BW)
 5. Sprint PS sends Create QoS request (COPS message) to MSO's PCMM PS for subscriber IPnat
   IPnat: (IPha, TOS, Pnat, Pha, BWus, BWds)
 6. PCMM PS sends 2 COPS GATE SET requests to CMTS for subscriber IPnat
   US gate for IPnat: Classifier(IPha, IPnat, TOS, Pha, Pnat), FlowSpec(BWus)
   DS gate for IPnat: Classifier(IPnat, IPha, TOS, Pnat, Pha), FlowSpec BWds)
 7. CMTS sends 2 DOCSIS 2.0 Dynamic Service Add (DSA) requests to hosting MTA for subscriber IPnat
   US dynamic SF: Classifier(IPha, IPnat, TOS, Pha, Pnat), QoS Params(FlowSpec(BWus))
   DS dynamic SF: Classifier(IPnat, IPha, TOS, Pnat, Pha), QoS Params(FlowSpec(BWds))
   RTP Media stream SFs are now active between CMTS and MTA—SIP stream remains in default SFs
 8. RTP media stream begins between MP and MG via IPsec tunnel and SBC using dynamic SFs between CMTS and MTA FIG. 4 illustrates the tear down procedures necessary for removing QoS on the tunnel that was set up as shown in FIG. 3.

In the ninth step [9] (continuing from the eighth step in the setup procedure described above), SIP call teardown begins for RTP media stream between IPmp and IPmg.

In the tenth step [10], the SBC edge proxy 44 sends an RTP media QoS teardown request to Sprint PS 34 for MP at IPmp with TOS and BW requirements: IPmp: (TOS, BW).

In the eleventh step [11], Sprint PS 34 sends a Delete QoS request (COPS message) to the PCMM PS 36 of the MSO network for subscriber IPnat [IPnat: (IPha, TOS, Pnat, Pha, BWus, BWds)].

In the twelfth step [12], the PCMM PS 36 sends two COPS GATE DEL requests to CMTS 38 for subscriber IPnat. (US gate for IPnat: Classifier(IPha, IPnat, TOS, Pha, Pnat), FlowSpec(BWus); DS gate for IPnat: Classifier(IPnat, IPha, TOS, Pnat, Pha), FlowSpec BWds)).

In the thirteenth step [13], CMTS 38 sends two DOCSIS 2.0 Dynamic Service Delete (DSD) requests to hosting MTA for subscriber IPnat (US dynamic SF: Classifier(IPha, IPnat, TOS, Pha, Pnat), QoS Params(FlowSpec(BWus)); DS dynamic SF: Classifier(IPnat, IPha, TOS, Pnat, Pha), QoS Params(FlowSpec(BWds))). RTP Media stream SFs are now terminated between CMTS 38 and MTA. SIP stream and cleanup of RTP media stream remains in default SFs.

Finally, in the fourteenth step, the RTP media stream is removed between MP 30 and MG.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method implemented by a policy server (34) in a second network for a session between a client (30) in a first network and a destination in the second network, wherein the session passes through a tunnel in the first network to the second network, said method comprising:
  after a tunnel has been established between the client (30) in the first network and a tunnel termination device (42) in the second network:
  receiving, at the policy server (34) in the second network, a mapping of a header address to a tunnel address for the tunnel, said header address identifying the session and the mapping identifying the tunnel through which data packets belonging to the session are being sent;
  receiving, at the policy server (34) in the second network, an instruction to apply a specified QoS to packets having said header address;
  mapping, at the policy server (34) in the second network and using said received mapping of said header address to said tunnel address, said header address associated with said instruction to the tunnel address;

identifying, at the policy server (34) in the second network, a policy server (36) the first network that is responsible for the tunnel identified by said tunnel address; and sending, from the policy server (34) in the second network, instructions to the policy server (36) in the first network to apply the specified QoS to the packets traversing the tunnel.

2. The method of claim 1, wherein receiving the mapping involves receiving the mapping from the tunnel termination device (42) in the second network.

3. The method of claim 1, wherein receiving the instruction involves receiving the instruction from a server (32) in the second network.

4. The method of claim 3, wherein receiving the instruction involves receiving the instruction from a SIP proxy server (32) in the second network.

5. The method of claim 1, further comprising storing the received mapping locally to the policy server (34).

6. The method of claim 1, wherein the client (30) is a multi-mode device (30) that performs tunnel formation and termination functions at a client end of the tunnel, and the tunnel termination device (42) is a home agent server that performs tunnel formation and termination functions at a first network end of the tunnel.

7. The method of claim 6, wherein the first network is a wireless service provider network, and the second network is a cable MSO network.

8. A policy server (34) for a session between a client (30) on a first network and a destination on a second network, wherein the session passes through a tunnel in the first network to the second network, said policy server (34) for, after the tunnel has been established between the client (30) in the first network and a tunnel termination device (42) in the second network, receiving a mapping of a header address to a tunnel address for the tunnel, said header address identifying the session and the mapping identifying the tunnel through which data packets belonging to the session are being sent, for receiving an instruction to apply a specified QoS to packets having said header address, for mapping, using said received mapping of said header address to said tunnel address, said header address associated with said instruction to the tunnel address, for identifying a policy server (36) in the first network that is responsible for the tunnel identified by said tunnel address, and for sending instructions to the identified policy server (36) in first network to apply the specified QoS to the packets.

9. The system of claim 8, wherein receiving the mapping involves receiving the mapping from the tunnel termination device (42) in the second network.

10. The system of claim 8, wherein receiving the instruction involves receiving the instruction from a server (32) in the second network.

11. The system of claim 10, wherein receiving the instruction involves receiving the instruction from a SIP proxy server (23) in the second network.

12. The system of claim 8, further comprising storing the received mapping locally to the policy server (34).

13. The system of claim 8, wherein the client (30) is a multi-mode device (30) that performs tunnel formation and termination functions at a client end of the tunnel, and the tunnel termination device (42) is a home agent server (42) that performs tunnel formation and termination functions at a first network end of the tunnel.

14. The system of claim 13, wherein the first network is a wireless service provider network, and the second network is a cable MSO network.

\* \* \* \* \*